United States Patent
Yashiro et al.

(10) Patent No.: US 10,753,269 B2
(45) Date of Patent: Aug. 25, 2020

(54) ENGINE SYSTEM, ENGINE SYSTEM CONTROL DEVICE, ENGINE SYSTEM CONTROL METHOD, AND PROGRAM

(71) Applicant: MITSUBISHI HEAVY INDUSTRIES ENGINE & TURBOCHARGER, LTD., Sagamihara-shi, Kanagawa (JP)

(72) Inventors: Yusuke Yashiro, Tokyo (JP); Yoshihiro Hayashi, Tokyo (JP); Byeongil An, Tokyo (JP); Yuuji Wakai, Tokyo (JP)

(73) Assignee: MITSUBISHI HEAVY INDUSTRIES ENGINE & TURBOCHARGER, LTD., Sagamihara-Shi (JP)

( * ) Notice: Subject to any disclaimer, the term of this patent is extended or adjusted under 35 U.S.C. 154(b) by 0 days.

(21) Appl. No.: 16/077,313

(22) PCT Filed: Mar. 7, 2016

(86) PCT No.: PCT/JP2016/057019
§ 371 (c)(1),
(2) Date: Aug. 10, 2018

(87) PCT Pub. No.: WO2017/154082
PCT Pub. Date: Sep. 14, 2017

(65) Prior Publication Data
US 2019/0078505 A1    Mar. 14, 2019

(51) Int. Cl.
*F02B 37/04* (2006.01)
*F02B 37/16* (2006.01)
(Continued)

(52) U.S. Cl.
CPC .............. *F02B 37/04* (2013.01); *F02B 33/34* (2013.01); *F02B 37/007* (2013.01); *F02B 37/16* (2013.01);
(Continued)

(58) Field of Classification Search
CPC ...... F02B 37/007; F02B 37/04; F02B 37/162; F02B 37/16; F02B 33/34; F02B 39/10;
(Continued)

(56) References Cited

U.S. PATENT DOCUMENTS 6,920,756 B2    7/2005  Hoecker et al.
9,151,215 B2 *  10/2015 Timmons .............. F02D 23/005
(Continued)

FOREIGN PATENT DOCUMENTS

AU    200048759 B2    1/2001
EP    1 070 837 A2    1/2001
(Continued)

OTHER PUBLICATIONS

International Search Report (Form PCT/ISA/210) for International Application No. PCT/JP2016/057019, dated May 24, 2016, with English translation.
(Continued)

*Primary Examiner* — Thai Ba Trieu
*Assistant Examiner* — Dapinder Singh
(74) *Attorney, Agent, or Firm* — Birch, Stewart, Kolasch & Birch, LLP

(57) ABSTRACT

A control device according to the present invention determines whether a demand load demanded of an engine exceeds a load threshold. The control device starts an electric motor if the demand load exceeds the load threshold. If the demand load is equal to or less than the load threshold, the control device performs control such that the degree of opening of an on-off valve increases monotonically with respect to the demand load. The control device switches the on-off valve from an open state to a closed state when the electric motor starts.

7 Claims, 5 Drawing Sheets

(51) Int. Cl.
F02B 33/34 (2006.01)
F02B 37/00 (2006.01)
F02D 41/00 (2006.01)
F02D 41/04 (2006.01)
F02B 37/007 (2006.01)
F02B 39/10 (2006.01)

(52) U.S. Cl.
CPC ........ *F02B 37/162* (2019.05); *F02D 41/0007* (2013.01); *F02D 41/04* (2013.01); *F02B 39/10* (2013.01); *F02D 2200/04* (2013.01); *F02D 2200/0406* (2013.01); *F02D 2200/1002* (2013.01); *F02D 2250/18* (2013.01); *Y02T 10/144* (2013.01)

(58) Field of Classification Search
CPC .. F02D 41/0007; F02D 41/04; F02D 2200/04; F02D 2200/1002; F02D 2200/0406; F02D 2250/18; Y02T 10/144
USPC ..................... 60/602, 605.2, 605.1, 607, 608
See application file for complete search history.

(56) References Cited

U.S. PATENT DOCUMENTS 9,599,013 B2* 3/2017 Ahrns ..................... F02B 39/10

2012/0079823 A1* 4/2012 Son ....................... F02B 37/04
 60/602
2014/0305413 A1 10/2014 Ahrns
2016/0061102 A1* 3/2016 Sugiyama ............... F02B 37/04
 60/611
2016/0265468 A1 9/2016 Takayanakgi et al.

FOREIGN PATENT DOCUMENTS

| EP | 1 391 595 A1 | 2/2004 |
| EP | 3153684 A1 | 4/2017 |
| JP | 2004-278430 A | 10/2004 |
| JP | 2005-61243 A | 3/2005 |
| JP | 2007-92683 A | 4/2007 |
| JP | 2015-108329 A | 6/2015 |
| JP | 2015-230000 A | 12/2015 |
| WO | WO 2016/001281 A1 | 1/2016 |
| WO | WO 2016/002964 A1 | 1/2016 |

OTHER PUBLICATIONS

Written Opinion of the International Searching Authority (Form PCT/ISA/237) for International Application No. PCT/JP2016/057019, dated May 24, 2016, with English translation.

* cited by examiner

ENGINE SYSTEM, ENGINE SYSTEM CONTROL DEVICE, ENGINE SYSTEM CONTROL METHOD, AND PROGRAM

TECHNICAL FIELD

The present invention relates to an engine system, an engine system control device, an engine system control method, and a program.

BACKGROUND ART

Efficiency of a turbocharger depends on energy that a turbine receives from exhaust air. Therefore, effects of the turbocharger are small in a low rotation region where the amount of exhaust air from an engine is small. Accordingly, an engine system has been studied, in which a turbocharger and an electric compressor are provided in an air supply path and turbocharging can be performed even in a case where the amount of exhaust air is small (refer to PTL 1).

CITATION LIST

Patent Literature

[PTL 1] U.S. Pat. No. 6,920,756

SUMMARY OF INVENTION

Technical Problem

In general, in order to control a load of an engine, a throttle valve is provided in an engine system. The throttle valve is a valve which adjusts an inflow amount of intake air of the engine. Meanwhile, if the engine system has a turbocharging system, the number of parts increases, and thus, a cost of the engine system increases.

An object of the present invention is to provide an engine system, an engine system control device, an engine system control method, and a program capable of decreasing the number parts in an engine system including a turbocharger and an electric compressor.

Solution to Problem

According to a first aspect of the present invention, there is provided a control device for an engine system including an engine, a first compressor which is provided in an intake flow path through which intake air supplied to the engine flows and is driven to compress the intake air, an electric motor which drives the first compressor, a second compressor which is provided in the intake flow path independently of the first compressor and compresses the intake air, a turbine which is provided in an exhaust flow path through which exhaust air from the engine flows and is rotated by the exhaust air so as to drive the second compressor, a bypass flow path which is connected to the intake flow path and bypasses the first compressor, and an on-off valve which opens or closes the bypass flow path, the control device including: a load determination unit which determines whether or not a load required by the engine exceeds a load threshold value; an electric motor control unit which starts the electric motor in a case where the required load exceeds the load threshold value; and a valve control unit which performs a control such that an opening degree of the on-off valve monotonically increases with respect to the required load in a case where the required load is equal to or less than the load threshold value and switches the on-off valve from an open state to a closed state in a case where the electric motor starts.

According to a second aspect of the present invention, in the control device of an engine system according to the first aspect, the valve control unit may switch the on-off valve from an open state to a closed state after the electric motor is started by the electric motor control unit.

According to a third aspect of the present invention, in the control device of an engine system according to the second aspect, the control device may further a first acquisition unit which acquires a physical quantity relating to a rotation of the first compressor, and the valve control unit may switch the on-off valve from the open state to the closed state after the electric motor starts and in a case where the physical quantity acquired by the first acquisition unit exceeds a predetermined threshold value.

According to a fourth aspect of the present invention, in the control device of an engine system according to any one of the first to third aspects, the control device may further include a second acquisition unit which acquires a physical quantity relating to a rotation of the second compressor, the electric motor control unit may stop the electric motor in a case where the physical quantity acquired by the second acquisition unit exceeds a predetermined threshold value, and the valve control unit may switch the on-off valve from the closed state to the open state at a speed corresponding to a rotation speed of the electric motor.

According to a fifth aspect of the present invention, there is provided an engine system, including: an engine; a first compressor which is provided in an intake flow path through which intake air supplied to the engine flows and is driven to compress the intake air; an electric motor which drives the first compressor; a second compressor which is provided in the intake flow path independently of the first compressor and compresses the intake air; a turbine which is provided in an exhaust flow path through which exhaust air from the engine flows and is rotated by the exhaust air so as to drive the second compressor; a bypass flow path which is connected to the intake flow path and bypasses the first compressor; an on-off valve which opens or closes the bypass flow path; and the control device according to any one of the first to fifth aspects.

According to a seventh aspect of the present invention, there is provided control method for an engine system including an engine, a first compressor which is provided in an intake flow path through which intake air supplied to the engine flows and is driven to compress the intake air, an electric motor which drives the first compressor, a second compressor which is provided in the intake flow path independently of the first compressor and compresses the intake air, a turbine which is provided in an exhaust flow path through which exhaust air from the engine flows and is rotated by the exhaust air so as to drive the second compressor, a bypass flow path which is connected to the intake flow path and bypasses the first compressor, and an on-off valve which opens or closes the bypass flow path, the control method including: determining whether or not a load required by the engine exceeds a load threshold value; starting the electric motor in a case where the required load exceeds the load threshold value; switching the on-off valve from an open state to a closed state in a case where the electric motor starts; and performing a control such that an opening degree of the on-off valve monotonically increases with respect to the required load in a case where the required load is equal to or less than the load threshold value.

According to an eighth aspect of the present invention, there is provided a program for causing a computer of a control device for an engine system including an engine, a first compressor which is provided in an intake flow path through which intake air supplied to the engine flows and is driven to compress the intake air, an electric motor which drives the first compressor, a second compressor which is provided in the intake flow path independently of the first compressor and compresses the intake air, a turbine which is provided in an exhaust flow path through which exhaust air from the engine flows and is rotated by the exhaust air so as to drive the second compressor, a bypass flow path which is connected to the intake flow path and bypasses the first compressor, and an on-off valve which opens or closes the bypass flow path, to execute: determining whether or not a load required by the engine exceeds a load threshold value; starting the electric motor in a case where the required load exceeds the load threshold value; switching the on-off valve from an open state to a closed state in a case where the electric motor starts; and performing a control such that an opening degree of the on-off valve monotonically increases with respect to the required load in a case where the required load is equal to or less than the load threshold value.

Advantageous Effects of Invention

In the case where the required load is equal to or less than the load threshold value, the intake flow path passing through the first compressor is closed by the stopped first compressor. That is, in the case where the required load is equal to or less than the load threshold value, most of the intake air is supplied to the engine through the bypass flow path. Accordingly, in the control device according to at least one of the above-described aspects, by controlling the opening degree of the on-off valve which opens or closes the bypass flow path in the case where the required load is equal to or less than the load threshold value, it is possible to adjust the inflow amount of the intake air of the engine. Accordingly, in the engine system, it is possible to adjust the inflow amount of the intake air of the engine without having the throttle valve.

DESCRIPTION OF EMBODIMENTS

First Embodiment

Hereinafter, embodiments will be described in detail with reference to the drawings.

Figure 1:
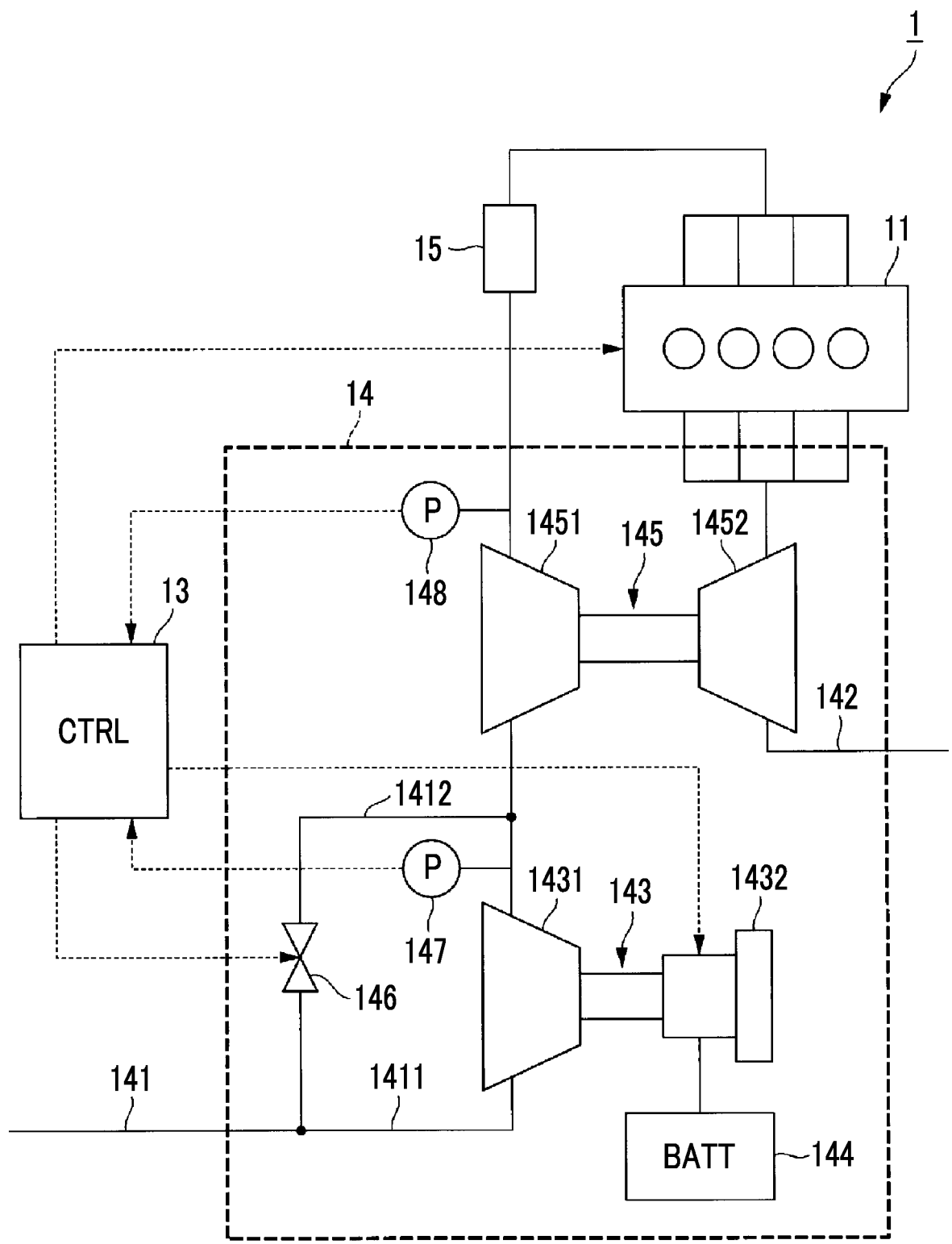
FIG. 1 is a schematic configuration diagram of an engine system according to a first embodiment.

FIG. 1 is a schematic configuration diagram of an engine system according to a first embodiment.

The engine system 1 includes an engine 11, an engine controller 13, a turbocharging system 14, and an intercooler 15. The engine system 1 according to the first embodiment does not have a throttle valve which controls a flow rate of intake air supplied to the engine 11.

Examples of the engine 11 include a gasoline engine and a diesel engine.

Based on an engine control signal including a rotation speed and a required load, the engine controller 13 performs adjustment of a fuel injection amount of the engine 11, a control of the turbocharging system 14, and other controls. The required load is a load which is required by the engine. The engine controller 13 is an example of an engine system control device.

The turbocharging system 14 is a system which increases a density of the intake air of the engine 11 to obtain high combustion energy.

The intercooler 15 cools the intake air compressed by the turbocharging system 14.

The turbocharging system 14 according to the first embodiment includes an intake flow path 141, an exhaust flow path 142, an electric compressor 143, a battery 144, a turbocharger 145, a bypass valve 146 (on-off valve), a first pressure sensor 147, and a second pressure sensor 148.

The intake flow path 141 is a pipe through which the intake air flows to the engine 11. The intake flow path 141 including a main intake flow path 1411 passing through the turbocharger 145 and the electric compressor 143 and bypass flow path 1412 passing through the turbocharger 145 without passing through the electric compressor 143.

The exhaust flow path 142 is a pipe through which the exhaust air flows from the engine 11.

The electric compressor 143 is a device which compresses the intake air of the engine 11 by electricity supplied from the battery 144. The electric compressor 143 includes a compressor 1431 (first compressor) and an electric motor 1432. The compressor 1431 is provided in the main intake flow path 1411 of the intake flow path 141. The compressor 1431 is rotated to compress the intake air. The electric motor 1432 receives the supply of electricity from the battery 144 so as to be driven. The electric motor 1432 and the compressor 1431 are rotated by a common shaft. Accordingly, the electric motor 1432 drives the compressor 1431.

The turbocharger 145 is a device which compresses the intake air of the engine 11 by the exhaust air of the engine 11. The turbocharger 145 includes a compressor 1451 (second compressor) and a turbine 1452. The compressor 1451 is provided in the intake flow path 141 of the engine 11. The compressor 1451 is rotated to compress the intake air. The turbine 1452 is provided in the exhaust flow path 142 of the engine 11. The turbine 1452 and the compressor 1451 are rotated by a common shaft. Accordingly, the turbine 1452 is rotated by the exhaust air to drive the compressor 1451.

The bypass valve 146 is provided in the bypass flow path 1412 in the intake flow path 141. If the bypass valve 146 is opened, a flow rate of the intake air passing through the electric compressor 143 decreases. If the bypass valve 146 is closed, the flow rate of the intake air passing through the electric compressor 143 increases.

The first pressure sensor 147 measures an outlet pressure of the electric compressor 143 (compressor 1431).

The second pressure sensor 148 measures an outlet pressure of the turbocharger 145 (compressor 1451).

Figure 2:
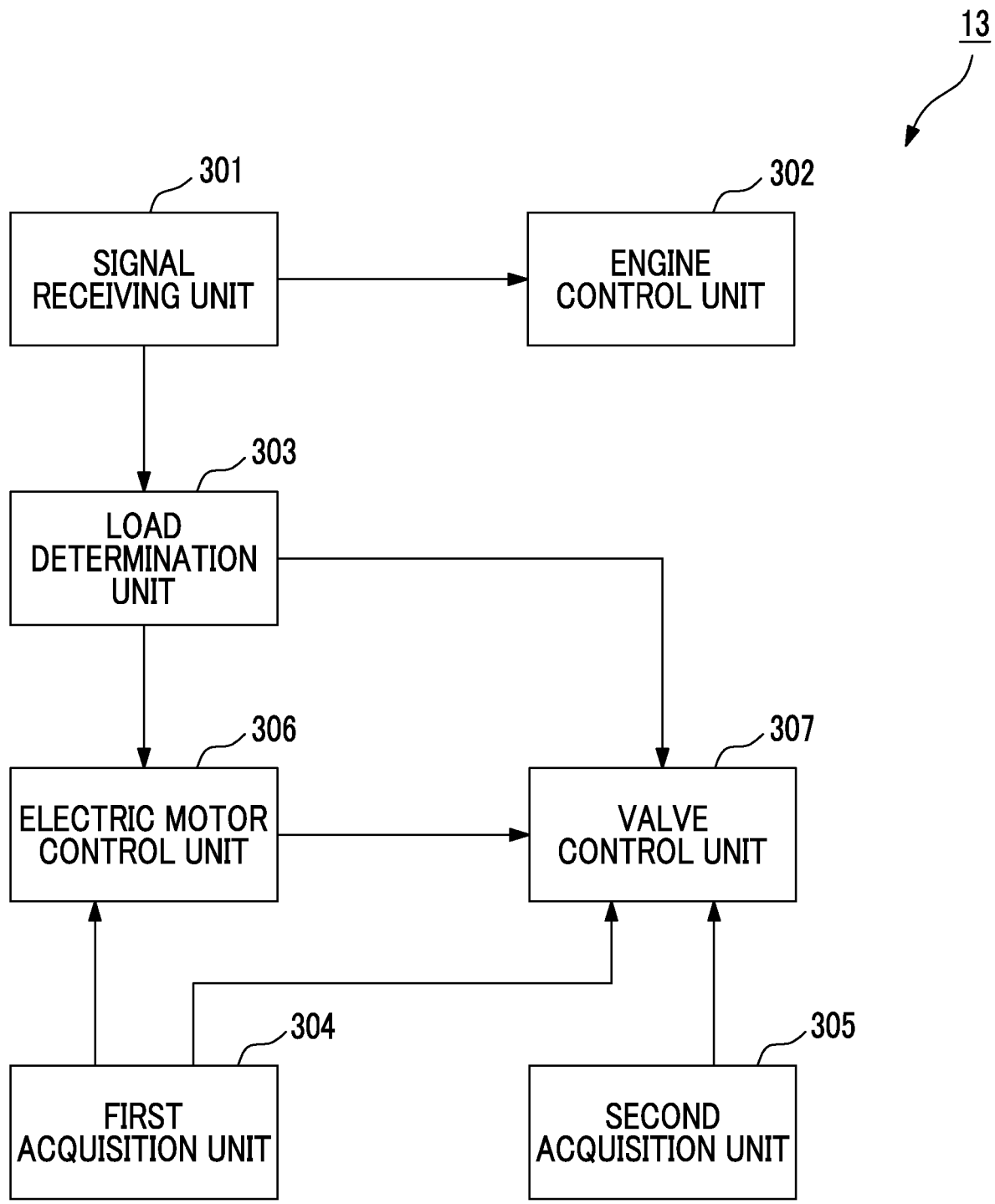
FIG. 2 is a schematic block diagram showing a software configuration of an engine controller according to the first embodiment.

FIG. 2 is a schematic block diagram showing a software configuration of the engine controller according to the first embodiment.

The engine controller 13 includes a signal receiving unit 301, an engine control unit 302, a load determination unit 303, a first acquisition unit 304, a second acquisition unit 305, an electric motor control unit 306, and a valve control unit 307.

The signal receiving unit 301 receives the engine control signal.

Based on the engine control signal received by the signal receiving unit 301, the engine control unit 302 controls a fuel injection amount and a fuel injection timing of the engine 11.

The load determination unit 303 determines whether or not the required load included in the engine control signal received by the signal receiving unit 301 exceeds a load threshold value. For example, as the load threshold value, the maximum load which can be output by natural intake of the engine 11 can be used. That is, in a case where the required load exceeds the load threshold value, in order for the engine 11 to output the required load, it is necessary to increase a density of the intake air by the turbocharging system 14.

The first acquisition unit 304 acquires a sensor signal indicating an outlet pressure of the electric compressor 143 from the first pressure sensor 147.

The second acquisition unit 305 acquires a sensor signal indicating an outlet pressure of the turbocharger 145 from the second pressure sensor 148.

Based on a determination result of the load determination unit 303 and the sensor signal acquired by the second acquisition unit 305, the electric motor control unit 306 controls a rotation speed of the electric motor 1432.

Based on the determination result of the load determination unit 303 and the sensor signal acquired by the first acquisition unit 304, the valve control unit 307 controls an opening degree of the bypass valve 146.

Figure 3:
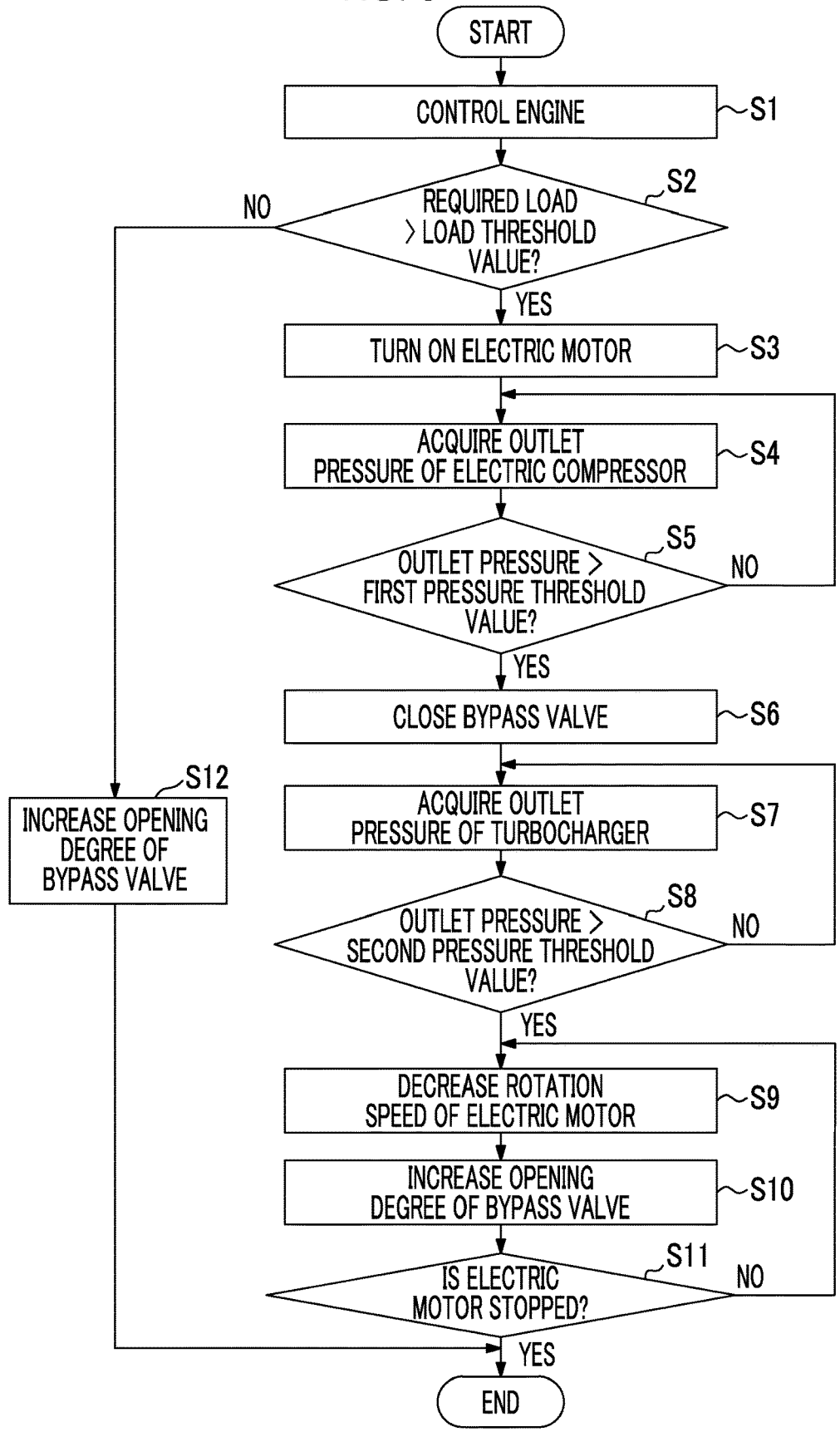
FIG. 3 is a flowchart showing a control operation of a turbocharging system by the engine controller according to the first embodiment.

FIG. 3 is a flowchart showing a control operation of a turbocharging system by the engine controller according to the first embodiment.

If the signal receiving unit 301 of the engine controller 13 receives the engine control signal from the engine controller 13, based on the engine control signal, the engine control unit 302 controls the fuel injection amount and the fuel injection timing of the engine 11 (Step S1). The load determination unit 303 determines whether or not the required load of the engine 11 included in the engine control signal exceeds the load threshold value (Step S2). In a case where the required load exceeds the load threshold value (Step S2: YES), the electric motor control unit 306 starts supply of electricity from the battery 144 to the electric motor 1432. Accordingly, the electric motor 1432 starts (Step S3). After the electric motor 1432 starts, the rotation speed of the electric motor 1432 gradually increases to reach a target rotation speed. That is, the rotation speed of the electric motor 1432 immediately after electric motor 1432 starts does not reach the target rotation speed.

The first acquisition unit 304 acquires the sensor signal indicating the outlet pressure of the electric compressor 143 from the first pressure sensor 147 (Step S4). The valve control unit 307 determines whether or not the outlet pressure indicated by the sensor signal acquired by the first acquisition unit 304 exceeds a first pressure threshold value (Step S5). The first pressure threshold value corresponds to an outlet pressure of the electric compressor 143 when the rotation speed of the electric compressor 143 exceeds a predetermined speed and air having a sufficient flow rate flows to the main intake flow path 1411 by the electric compressor 143. The first pressure threshold value is a value obtained by experiment or simulation in advance. In a case where the outlet pressure of the electric compressor 143 is equal to or less than the first pressure threshold value (Step S5: NO), the engine controller 13 returns the processing to Step S4, and thus, the sensor signal is acquired again.

Meanwhile, in a case where the outlet pressure of the electric compressor 143 exceeds the first pressure threshold value (Step S5: YES), the valve control unit 307 closes the bypass valve 146 (Step S6). That is, the valve control unit 307 changes the opening degree of the bypass valve 146 to 0%. Accordingly, the intake air flows into the turbocharger 145 through the main intake flow path 1411 without passing through the bypass flow path 1412. Accordingly, the electric compressor 143 starts an assistance of turbocharging. In this way, the valve control unit 307 switches the bypass valve 146 from an open state to a closed state after the electric motor 1432 is started by the electric motor control unit 306.

If the electric compressor 143 starts an assistance in compression of the intake air, the second acquisition unit 305 acquires the sensor signal indicating the outlet pressure of the turbocharger 145 from the second pressure sensor 148 (Step S7). The electric motor control unit 306 determines whether or not the outlet pressure indicated by the sensor signal acquired by the second acquisition unit 305 exceeds a second pressure threshold value (Step S8). The second pressure threshold value corresponds to an outlet pressure of the turbocharger 145 when the rotation speed of the turbocharger 145 exceeds a predetermined speed and the assistance of the turbocharging by the electric compressor 143 is not necessary. The second pressure threshold value is a value obtained by experiment or simulation in advance. In a case where the outlet pressure of the turbocharger 145 is equal to or less than the second pressure threshold value (Step S8: NO), the engine controller 13 returns the processing to Step S6, and thus, the sensor signal is acquired again.

Meanwhile, in a case where the outlet pressure of the turbocharger 145 exceeds the second pressure threshold value (Step S8: YES), the electric motor control unit 306 decreases the rotation speed of the electric motor 1432 to a predetermined speed (Step S9). In addition, the valve control unit 307 increases the opening degree of the bypass valve 146 by a predetermined amount (Step S10). In this case, the valve control unit 307 increases the opening degree of the bypass valve 146 by an opening degree corresponding to a decrease of the rotation speed with respect to the target rotation speed of the electric motor 1432. For example, in a case where the electric motor control unit 306 decreases the rotation speed by 5% with respect to the target rotation speed of the electric motor 1432 under the control of Step S3, the valve control unit 307 increases the opening degree of the bypass valve 146 by 5%. The electric motor control unit 306 determines whether or not the electric motor 1432 is stopped (Step S11). In a case where the electric motor 1432 is not stopped (Step S11: NO), the engine controller 13 returns the processing to Step S9 so as to decrease the rotation speed of the electric motor 1432 and increase the opening degree of the bypass valve 146. Accordingly, when the rotation of the electric motor 1432 is stopped, the opening degree of the bypass valve 146 becomes 100%. In a case where the electric motor 1432 is stopped (Step S11: YES), the engine controller 13 completes the control operation of the electric compressor 143.

In addition, in a case where the required load is equal to or less than the load threshold value in Step S2 (Step S2: NO), the valve control unit 307 controls the opening degree of the bypass valve 146 to an opening degree corresponding to the required load (Step S12). For example, the valve control unit 307 changes the opening degree of the bypass valve 146 to an opening degree corresponding to a ratio of the required load with respect to the load threshold value. That is, the valve control unit 307 performs the control such that the opening degree of the bypass valve 146 monotonically increases with respect to the required load. Accordingly, the flow rate of the intake air flowing through the intake flow path 141 monotonically increases with respect to the required load. According to this control, in the engine controller 13, the bypass valve 146 can realize the same function as that of a throttle valve in the related art.

As described above, according to the first embodiment, in the case where the required load is equal to or less than the load threshold value, the valve control unit 307 performs the control such that the opening degree of the bypass valve 146 monotonically increases with respect to the required load. Accordingly, the engine system 1 can adjust the flow rate of the intake air at the time of a partial load without having a throttle valve.

When the required load is equal to or less than the load threshold value, in the engine 11, it is necessary to decrease an air flow rate, and thus, the electric compressor 143 is not driven. Meanwhile, when the required load exceeds the load threshold value, in the engine 11, it is necessary to increase the air flow rate, and thus, limitation of the flow rate of the intake air by the throttle valve in the related art is not performed. As described above, a timing at which the flow rate of the intake air should be limited and a timing at which the electric compressor 143 is not driven do not overlap each other, and thus, the limitation of the flow rate of the intake air and a flow path change to the electric compressor 143 can be integrated in the bypass valve 146.

According to the first embodiment, the engine controller 13 can limit the flow rate of the intake air without depending on the throttle valve. Accordingly, compared to a case where the flow rate of the intake air is adjusted by the throttle valve, in the engine controller 13, it is possible to decrease a pumping loss.

According to the first embodiment, after the electric motor 1432 is started by the electric motor control unit 306, the valve control unit 307 switches the bypass valve 146 from the open state to the closed state. Accordingly, the valve control unit 307 can prevent the supply air pressure immediately after the electric motor 1432 starts from decreasing. Particularly, according to the first embodiment, in a case where the outlet pressure of the electric compressor 143 exceeds the first pressure threshold value, the valve control unit 307 switches the bypass valve 146 from the open state to the closed state. Accordingly, after the rotation speed of the electric motor 1432 reliably reaches a constant value, the valve control unit 307 can close the bypass valve 146.

According to the first embodiment, in the case where the outlet pressure of the turbocharger 145 exceeds the second pressure threshold value, the engine controller 13 gradually decreases the speed of the electric motor 1432 and switches the bypass valve 146 from the closed state to the open state at a speed corresponding to the rotation speed of the electric motor 1432. In this way, the speed of the electric motor 1432 and the opening degree of the bypass valve 146 are gradually changed, and thus, it is possible to decrease influences of a resistance caused by deceleration of the electric compressor 143. That is, according to the engine controller 13 of the first embodiment, it is possible to prevent the turbocharging amount of the turbocharging system 14 from rapidly decreasing.

Other Embodiments

Hereinbefore, the embodiment is described above in detail with reference to the drawings. However, specific configurations are not limited to those described above, and various design changes or the like can be made.

For example, in the above-described embodiment, based on the outlet pressure of the electric compressor 143, the valve control unit 307 controls the opening degree of the bypass valve 146. However, the present invention is not limited to this. For example, based on other physical quantities relating to a rotation speed or torque of an electric compressor 143 or a rotation of the electric compressor 143, a valve control unit 307 according to another embodiment may control an opening degree of a bypass valve 146. Still another embodiment, based on an elapsed time from start of an electric motor 1432, a valve control unit 307 may control an opening degree of a bypass valve 146. For example, the valve control unit 307 may close the bypass valve 146 when 0.1 seconds are elapsed after an electric motor control unit 306 starts the electric motor 1432.

In the above-described embodiment, based on the outlet pressure of the turbocharger 145, the electric motor control unit 306 controls the rotation speed of the electric motor 1432. However, the present invention is not limited thereto. For example, based on other physical quantities relating to a rotation speed or torque of a turbocharger 145 or a rotation of the turbocharger 145, an electric motor control unit 306 according to still another embodiment may control a rotation speed of an electric motor 1432.

Figure 4:
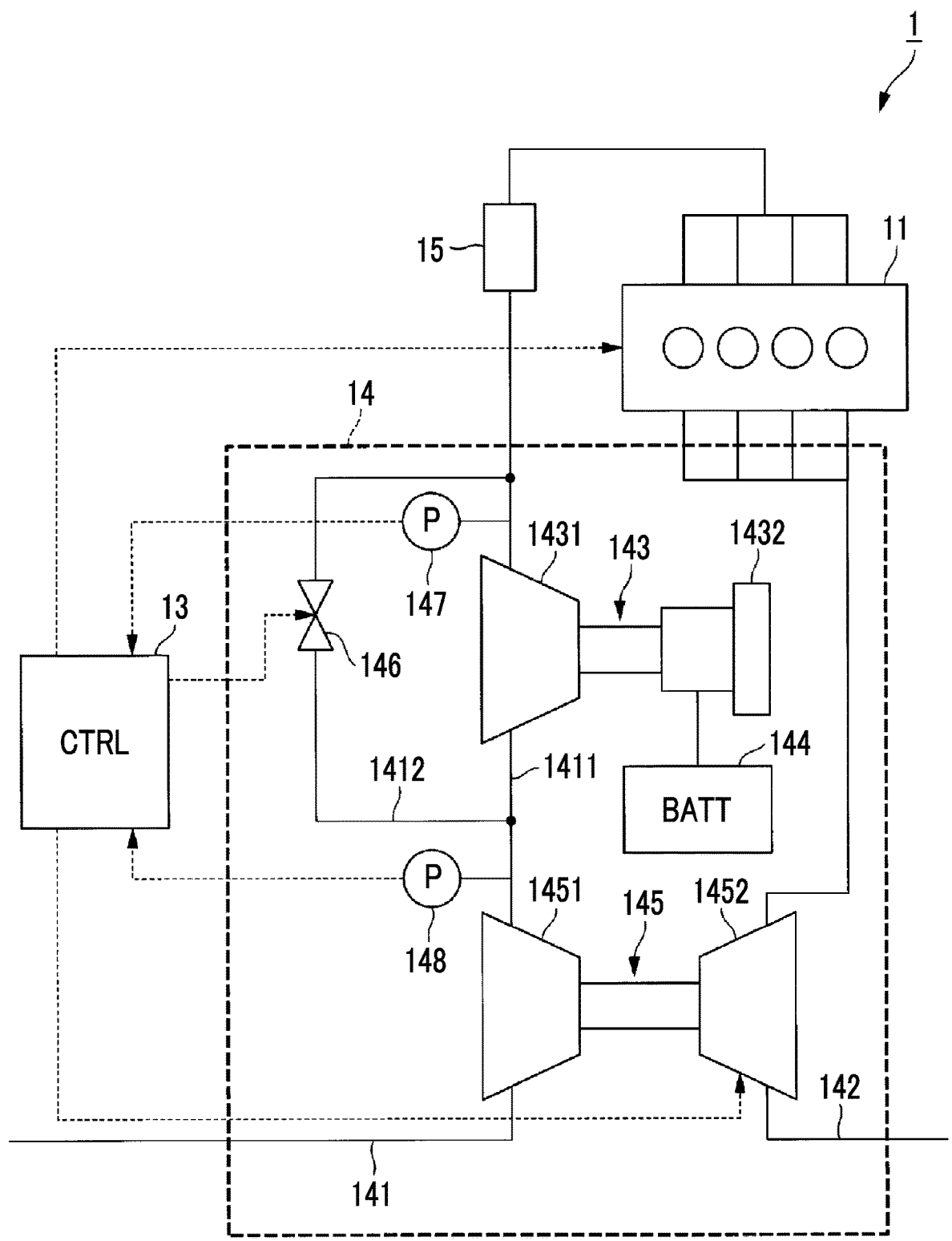
FIG. 4 is a schematic configuration diagram showing a modification example of the engine system according to the embodiment.

FIG. 4 is a schematic configuration diagram showing a modification example of the engine system according to the embodiment.

In the above-described embodiment, as shown in FIG. 1, the electric compressor 143 is provided at a front stage of the turbocharger 145. However, the present invention is not limited thereto. For example, in still another embodiment, as shown in FIG. 4, even when turbocharger 145 is provided at a front stage of an electric compressor 143, an engine controller 13 can exert effects similar to those of the above-described embodiment.

In the above-described embodiment, the engine controller 13 controls the engine 11 and the turbocharging system 14. However, the present invention is not limited thereto. For example, in still another embodiment, a turbo controller which controls a turbocharging system 14 separately from an engine controller 13 may be provided. In this case, when the required load is less than the load threshold value, the engine controller 13 outputs an opening degree command of the bypass valve 146 to the turbo controller.

<Computer Configuration>

Figure 5:
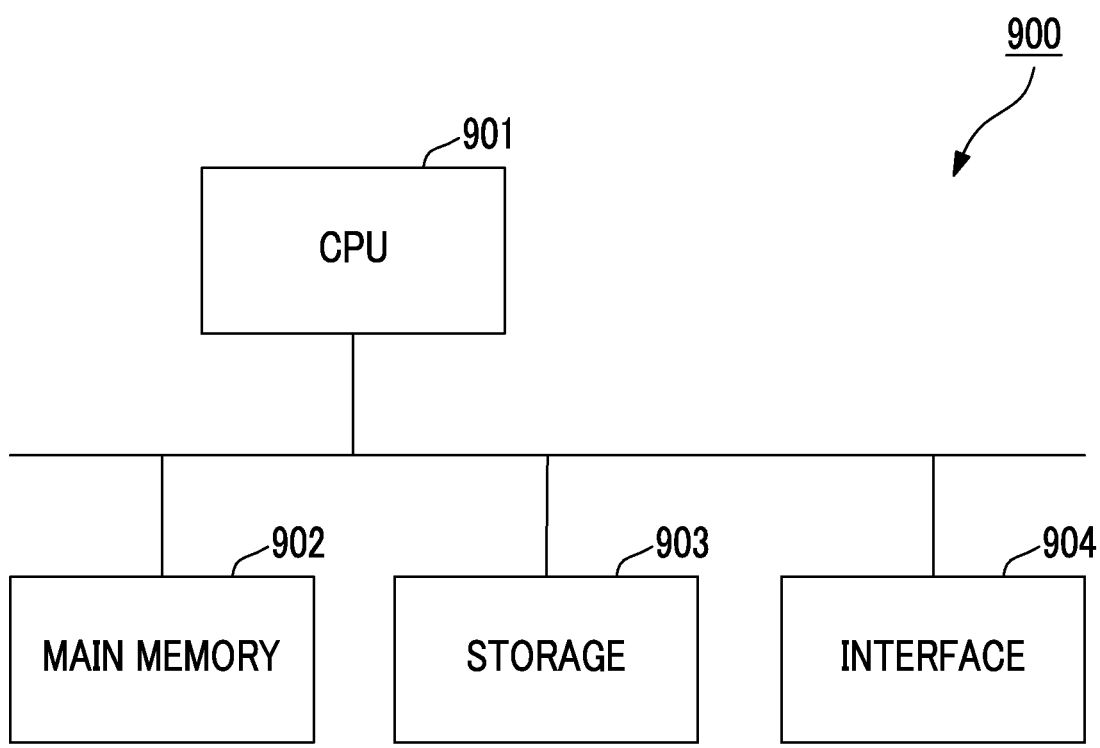
FIG. 5 is a schematic block diagram showing a configuration of a computer according to at least one embodiment.

FIG. 5 is a schematic block diagram showing a configuration of a computer according to at least one embodiment.

A computer 900 includes a CPU 901, a main memory 902, a storage 903, and an interface 904.

The above-described engine controller 13 is installed in the computer 900. In addition, the above-described operations of the respective processing units are stored in the storage 903 in the form of a program. The CPU 901 reads the program from the storage 903, develops the program in the main memory 902, and executes the processing according to the program.

In addition, in at least one embodiment, the storage 903 is an example of a non-transitory tangible medium. Other examples of the non-transitory tangible media include a magnetic disk, a magneto-optical disk, an optical disk, a semiconductor memory or the like connected via an interface 904. In a case where the program is distributed to the computer 900 via a communication line, the distributed computer 900 may develop the program in the main memory 902 and execute the processing.

The program may be provided to realize a portion of the above-mentioned functions. Moreover, the program may be a so-called difference file (difference program) which realizes the above-described functions by a combination with other programs already stored in the storage 903.

INDUSTRIAL APPLICABILITY

According to the engine system control device, in the case where the required load is equal to or less than the load threshold value, the intake flow path passing through the first compressor is closed by the stopped first compressor. That is, in the case where the required load is equal to or less than the load threshold value, most of the intake air is supplied to the engine through the bypass flow path. Accordingly, in the control device according to at least one of the above-described aspects, by controlling the opening degree of the on-off valve which opens or closes the bypass flow path in the case where the required load is equal to or less than the load threshold value, it is possible to adjust the inflow amount of the intake air of the engine. Accordingly, in the engine system, it is possible to adjust the inflow amount of the intake air of the engine without having the throttle valve.

REFERENCE SIGNS LIST

1: engine system
11: engine
13: engine controller
14: turbocharging system
141: intake flow path
1411: main intake flow path
1412: bypass flow path
142: exhaust flow path
143: electric compressor
1431: compressor
1432: electric motor
144: battery
145: turbocharger
1451: compressor
1452: turbine
146: bypass valve
147: first pressure sensor
148: second pressure sensor
301: signal receiving unit
302: engine control unit
303: load determination unit
304: first acquisition unit
305: second acquisition unit
306: electric motor control unit
307: valve control unit

The invention claimed is:

1. A control device for an engine system including
an engine,
an electric compressor including a first compressor which is provided in an intake flow path through which intake air supplied to the engine flows and is driven to compress the intake air, and
an electric motor which drives the first compressor,
a turbocharger including a second compressor which is provided in the intake flow path independently of the first compressor and compresses the intake air and
a turbine which is provided in an exhaust flow path through which exhaust air from the engine flows and is rotated by the exhaust air so as to drive the second compressor,
a bypass flow path which bypasses the first compressor and connects an upstream side of the first compressor in the intake flow path and an upstream side of the second compressor, and
an on-off valve which opens or closes the bypass flow path,
the control device comprising:
a load determination unit which determines, by a processor, whether or not a load required by the engine exceeds a load threshold value;
an electric motor control unit which by the processor starts the electric motor in a case where the required load exceeds the load threshold value; and
a valve control unit which performs a control, by the processor, such that an opening degree of the on-off valve monotonically increases with respect to the required load in a case where the required load is equal to or less than the load threshold value and switches the on-off valve from an open state to a closed state in a case where an outlet pressure of the first compressor relating to a rotation speed of the electric compressor exceeds a predetermined threshold value.

2. The control device for an engine system according to claim 1,
wherein the valve control unit, by the processor, switches the on-off valve from an open: state to a closed state after the electric motor is started by the electric motor control unit.

3. The control device for an engine system according to claim 2, further comprising:
a first acquisition unit which acquires the outlet pressure of the first compressor relating to the rotation speed of the electric compressor,
wherein the valve control unit, by the processor, switches the on-off valve from the open state to the closed state after the electric motor starts and in a case where the outlet pressure of the first compressor acquired by the first acquisition unit exceeds a predetermined threshold value.

4. The control device for an engine system according to claim 1, further comprising:
a second acquisition unit which acquires an outlet pressure of the second compressor relating to a rotation speed of the turbocharger,
wherein the electric motor control unit, by the processor, stops the electric motor in a case where the outlet pressure of the second compressor acquired by the second acquisition unit exceeds a predetermined threshold value, and
wherein the valve control unit, by the processor, control the on-off valve at an opening degree corresponding to a rotation speed of the electric motor.

5. An engine system comprising:
an engine;
an electric compressor including a first compressor which is provided in an intake flow path through which intake air supplied to the engine flows and is driven to compress the intake air and
an electric motor which drives the first compressor;
turbocharger including a second compressor which is provided in the intake flow path independently of the first compressor and compresses the intake air and a turbine which is provided in an exhaust flow path through which exhaust air from the engine flows and is rotated by the exhaust air so as to drive the second compressor;

a bypass flow path which bypasses the first compressor and connects an upstream side of the first compressor in the intake flow path and an upstream side of the second compressor;

an on-off valve which opens or closes the bypass flow path; and the control device according to claim 1.

6. A control method for an engine system including an engine, an electric compressor including a first compressor which is provided in an intake flow path through which intake air supplied to the engine flows and is driven to compress the intake air and an electric motor which drives the first compressor, a turbocharger including a second compressor which is provided in the intake flow path independently of the first compressor and compresses the intake air and a turbine which is provided in an exhaust flow path through which exhaust air from the engine flows and is rotated by the exhaust air so as to drive the second compressor, a bypass flow path which bypasses the first compressor and connects an upstream side of the first compressor in the intake flow path and an upstream side of the second compressor, and an on-off valve which opens or closes the bypass flow path, the control method comprising:

determining whether or not a load required by the engine exceeds a load threshold value;

starting the electric motor in a case where the required load exceeds the load threshold value;

switching the on-off valve from an open state to a closed state in a case where an outlet pressure of the first compressor relating to a rotation speed of the electric compressor exceeds a predetermined threshold value, and performing a control such that an opening degree of the on-off valve monotonically, increases with respect to the required load in a case where the required load is equal to or less than the load threshold value.

7. A non-transitory computer readable medium having stored thereon, a program for a computer of a control device for an engine system, the engine system including an engine, an electric compressor including a first compressor which is provided in an intake flow path through which intake air supplied to the engine flows and is driven to compress the intake air and an electric motor which drives the first compressor, a turbocharger including a second compressor which is provided in the intake flow path independently of the first compressor and compresses the intake air and a turbine which is provided in an exhaust flow path through which exhaust air from the engine flows and is rotated by the exhaust air so as to drive the second compressor, a bypass flow path which bypasses the first compressor and connects an upstream side of the first compressor in the intake flow path and an upstream side of the second compressor, and an on-off valve which opens or closes the bypass flow path, the program causing the computer to execute the steps of:

determining whether or not a load required by the engine exceeds a load threshold value;

starting the electric motor in a case where the required load exceeds the load threshold value;

switching the on-off valve from an open state to a closed state in a case where an outlet pressure of the first compressor relating to a rotation speed of the electric compressor exceeds a predetermined threshold value; and performing a control such that an opening degree of the on-off valve monotonically, increases with respect to the required load in a case where the required load is equal to or less than the load threshold value.

* * * * *